(12) United States Patent
Bui et al.

(10) Patent No.: US 8,760,788 B2
(45) Date of Patent: *Jun. 24, 2014

(54) SYSTEM AND COMPUTER PROGRAM PRODUCT FOR FAST RECOVERY TO A WRITE STATE

(75) Inventors: Nhan X. Bui, Tucson, AZ (US); Reed A. Hancock, Tucson, AZ (US); Tomoko Taketomi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/152,225

(22) Filed: Jun. 2, 2011

(65) Prior Publication Data

US 2012/0307390 A1 Dec. 6, 2012

(51) Int. Cl.
*G11B 15/087* (2006.01)
*G11B 5/584* (2006.01)

(52) U.S. Cl.
USPC .......................................... 360/60; 360/77.12

(58) Field of Classification Search
None
See application file for complete search history.

(56) References Cited

U.S. PATENT DOCUMENTS

| | | | |
|---|---|---|---|
| 6,313,964 B1 | 11/2001 | Lamberts et al. | |
| 6,587,303 B1 | 7/2003 | Bui et al. | |
| 6,600,616 B2 * | 7/2003 | McAllister et al. | 360/60 |
| 6,768,604 B2 * | 7/2004 | Anderson | 360/60 |
| 7,002,766 B2 | 2/2006 | Kisaka et al. | |
| 7,495,859 B2 * | 2/2009 | Weber et al. | 360/77.12 |
| 7,817,517 B2 | 10/2010 | Tomikura et al. | |
| 7,872,905 B2 | 1/2011 | Florez Marino et al. | |
| 8,520,332 B2 | 8/2013 | Bui et al. | |
| 8,611,038 B2 | 12/2013 | Bui et al. | |
| 2011/0102937 A1 | 5/2011 | Argumedo et al. | |
| 2011/0176238 A1* | 7/2011 | Shiratori et al. | 360/72.1 |
| 2012/0307391 A1 | 12/2012 | Bui | |
| 2012/0307392 A1 | 12/2012 | Bui | |

FOREIGN PATENT DOCUMENTS

| | | |
|---|---|---|
| JP | 05166157 | 7/1993 |
| JP | 2000067486 | 3/2000 |
| JP | 2013513194 | 4/2013 |

OTHER PUBLICATIONS

U.S. Appl. No. 13/483,789, filed May 30, 2012.
Qureshi, MK.-et al.; "Improving Read Performance of Phase Change Memories via Write Cancellation and Write Pausing"; In Proceedings of HPCA '2010; pp. 1-11; 2010.

(Continued)

*Primary Examiner* — Wayne Young
*Assistant Examiner* — James L Habermehl
(74) *Attorney, Agent, or Firm* — Zilka-Kotab, PC

(57) ABSTRACT

In one embodiment, a tape drive system includes a magnetic head having at least one servo sensor for track-following at least one defined servo track of a longitudinal tape, a tape motion controller configured to move the longitudinal tape past the magnetic head, a compound actuator configured to translate the magnetic head laterally with respect to the longitudinal tape, and a control configured to track-follow the at least one defined servo track by reducing a position error between the magnetic head and a desired position, transition from a write state to a monitor state when the position error is greater than a threshold, transition from the monitor state to a stop write state when the position error is greater than the threshold for a first period, and transition from the monitor state to the write state when the position error is less than the threshold for a second period.

11 Claims, 6 Drawing Sheets

(56) References Cited

OTHER PUBLICATIONS

Turner, DP.; "Transition Detector for DASD Write Operation"; IP.COM/Prior Art Database; IPCOM000100595D; IBM TDB n12, pp. 176-178; May 1, 1990.

Qureshi, MK.-et al.; "Improving Read Performance of Phase Change Memories via Write Cancellation and Write Pausing"; HPCA'2010; IBM Slide Presentation, IBM Corp.; 2007, 28 pages.
U.S. Appl. No. 12/716,067, filed Mar. 2, 2010.
U.S. Appl. No. 13/152,244, filed Jun. 2, 2011.

* cited by examiner

SYSTEM AND COMPUTER PROGRAM PRODUCT FOR FAST RECOVERY TO A WRITE STATE

BACKGROUND

The present invention relates to track-following a servo track during writing operations in a longitudinal tape system, and more particularly, to recovering from a stop write state after track-following is interrupted.

Current longitudinal tape drives, such as IBM® LTO Generation 5 tape drives, IBM® Jaguar 4 tape drives and later, among others, have methods to detect if the track following servo is getting off track, for whatever reason, and then shuts down the writing and track following activities to prevent the drive from over writing data in adjacent tracks. The shutdown is performed by monitoring a position error signal (PES) and detecting when the PES value exceeds a threshold value, commonly referred to as a "stop write" limit, for obvious reasons. If the PES value ever exceeds the stop write limit, the tape drive halts the write operation and stops track-following the servo track. When the PES value moves into an acceptable range, e.g., a range where the PES values are below the stop write limit by a certain amount, the drive re-acquires track-following lock and allows write operations to continue. This process stopping track-following and then later to recover from the stop write state and re-acquire track-following may take some time. And with the new flangeless tape paths of current tape drives, the process of re-acquiring track-following may be problematic and may require additional time to re-acquire the track-following state.

During this time when the tape drive is in the stop write state, the tape is still moving but data is not being written to tape, since the tape drive is in the stop write state. This, obviously, consumes tape storage capacity corresponding to the length of tape that passes by the head while the tape drive is in the stop write state.

BRIEF SUMMARY

In one embodiment, a tape drive system includes a magnetic head having at least one servo sensor for sensing a lateral position of the magnetic head with respect to at least one defined servo track of a longitudinal tape, a tape motion controller configured to operate at least one drive motor to move the longitudinal tape longitudinally past the magnetic head, a fine actuator configured to translate the magnetic head laterally with respect to the longitudinal tape, a coarse actuator configured to translate the fine actuator laterally with respect to the longitudinal tape, and a control configured to sense a first servo sensor of the at least one servo sensor, determine position error between the magnetic head and a desired position related to the at least one defined servo track, provide signals to operate the fine actuator to translate the magnetic head laterally in a manner to reduce the determined position error, transition from a write state to a monitor state when the determined position error is greater than a threshold error value, transition from the monitor state to a stop write state when the determined position error is greater than the threshold error value for a first predetermined period, and transition from the monitor state to the write state when the determined position error is less than the threshold error value for a second predetermined period. Write operations are enabled and signals are provided to operate the fine actuator to translate the magnetic head laterally in a manner to reduce the determined position error while in the write state, write operations are disabled and signals are provided to operate the fine actuator to translate the magnetic head laterally in a manner to reduce the determined position error while in the monitor state, and write operations are disabled and signals are not provided to operate the fine actuator while in the stop write state.

In another embodiment, a method includes sensing a servo sensor while a longitudinal tape is moved past a magnetic head, wherein the servo sensor is configured for sensing a lateral position of the magnetic head with respect to at least one defined servo track of the longitudinal tape, determining position error between the magnetic head and a desired position related to the at least one defined servo track, providing signals to operate a fine actuator to translate the magnetic head laterally in a manner to reduce the determined position error, wherein the fine actuator is configured to translate the magnetic head laterally with respect to the longitudinal tape, transitioning from a write state to a monitor state when the determined position error is greater than a threshold error value, transitioning from the monitor state to a stop write state when the determined position error is greater than the threshold error value for a first predetermined period, and transitioning from the monitor state to the write state when the determined position error is less than the threshold error value for a second predetermined period. Write operations are enabled and signals are provided to operate the fine actuator to translate the magnetic head laterally in a manner to reduce the determined position error while in the write state, write operations are disabled and signals are provided to operate the fine actuator to translate the magnetic head laterally in a manner to reduce the determined position error while in the monitor state, and write operations are disabled and signals are not provided to operate the fine actuator while in the stop write state.

In yet another embodiment, a computer program product includes a computer readable storage medium having computer readable program code embodied therewith. The computer readable program code is configured to sense a servo sensor while a longitudinal tape is moved past a magnetic head, wherein the servo sensor is configured for sensing a lateral position of the magnetic head with respect to at least one defined servo track of the longitudinal tape, determine position error between the magnetic head and a desired position related to the at least one defined servo track, provide signals to operate the fine actuator to translate the magnetic head laterally in a manner to reduce the determined position error, wherein the fine actuator is configured to translate the magnetic head laterally with respect to the longitudinal tape, transition from a write state to a monitor state when the determined position error is greater than a threshold error value, transition from the monitor state to a stop write state when the determined position error is greater than the threshold error value for a first predetermined period, and transition from the monitor state to the write state when the determined position error is less than the threshold error value for a second predetermined period. Write operations are enabled and signals are provided to operate the fine actuator to translate the magnetic head laterally in a manner to reduce the determined position error while in the write state, write operations are disabled and signals are provided to operate the fine actuator to translate the magnetic head laterally in a manner to reduce the determined position error while in the monitor state, and write operations are disabled and signals are not provided to operate the fine actuator while in the stop write state.

Other aspects and embodiments of the present invention will become apparent from the following detailed description, which, when taken in conjunction with the drawings, illustrates by way of example the principles of the invention.

DETAILED DESCRIPTION

Figure 1:
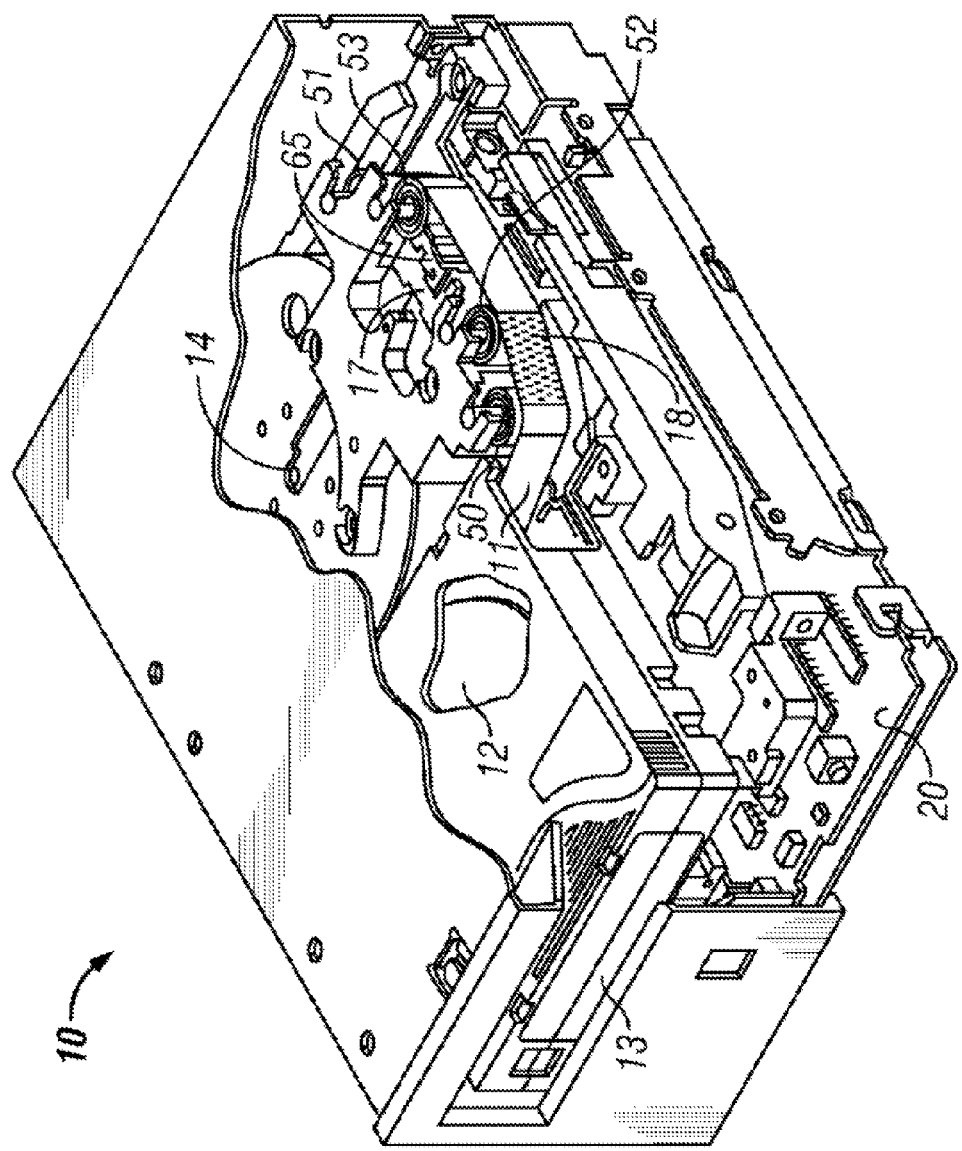
FIG. 1 is a partially cut away view of an exemplary magnetic tape data storage drive which may implement embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description describes methods and systems for recovering from a stop write state after track-following is interrupted.

In one general embodiment, a tape drive system includes a magnetic head having at least one servo sensor for sensing a lateral position of the magnetic head with respect to at least one defined servo track of a longitudinal tape, a tape motion controller configured to operate at least one drive motor to move the longitudinal tape longitudinally past the magnetic head, a fine actuator configured to translate the magnetic head laterally with respect to the longitudinal tape, a coarse actuator configured to translate the fine actuator laterally with respect to the longitudinal tape, and a control configured to sense a first servo sensor of the at least one servo sensor, determine position error between the magnetic head and a desired position related to the at least one defined servo track, provide signals to operate the fine actuator to translate the magnetic head laterally in a manner to reduce the determined position error, transition from a write state to a monitor state when the determined position error is greater than a threshold error value, transition from the monitor state to a stop write state when the determined position error is greater than the threshold error value for a first predetermined period, and transition from the monitor state to the write state when the determined position error is less than the threshold error value for a second predetermined period. Write operations are enabled and signals are provided to operate the fine actuator to translate the magnetic head laterally in a manner to reduce the determined position error while in the write state, write operations are disabled and signals are provided to operate the fine actuator to translate the magnetic head laterally in a manner to reduce the determined position error while in the monitor state, and write operations are disabled and signals are not provided to operate the fine actuator while in the stop write state.

In another general embodiment, a method includes sensing a servo sensor while a longitudinal tape is moved past a magnetic head, wherein the servo sensor is configured for sensing a lateral position of the magnetic head with respect to at least one defined servo track of the longitudinal tape, determining position error between the magnetic head and a desired position related to the at least one defined servo track, providing signals to operate a fine actuator to translate the magnetic head laterally in a manner to reduce the determined position error, wherein the fine actuator is configured to translate the magnetic head laterally with respect to the longitudinal tape, transitioning from a write state to a monitor state when the determined position error is greater than a threshold error value, transitioning from the monitor state to a stop write state when the determined position error is greater than the threshold error value for a first predetermined period, and transitioning from the monitor state to the write state when the determined position error is less than the threshold error value for a second predetermined period. Write operations are enabled and signals are provided to operate the fine actuator to translate the magnetic head laterally in a manner to reduce the determined position error while in the write state, write operations are disabled and signals are provided to operate the fine actuator to translate the magnetic head laterally in a manner to reduce the determined position error while in the monitor state, and write operations are disabled and signals are not provided to operate the fine actuator while in the stop write state.

In yet another general embodiment, a computer program product includes a computer readable storage medium having computer readable program code embodied therewith. The computer readable program code is configured to sense a servo sensor while a longitudinal tape is moved past a magnetic head, wherein the servo sensor is configured for sensing a lateral position of the magnetic head with respect to at least one defined servo track of the longitudinal tape, determine position error between the magnetic head and a desired position related to the at least one defined servo track, provide signals to operate the fine actuator to translate the magnetic head laterally in a manner to reduce the determined position error, wherein the fine actuator is configured to translate the magnetic head laterally with respect to the longitudinal tape, transition from a write state to a monitor state when the determined position error is greater than a threshold error value, transition from the monitor state to a stop write state when the determined position error is greater than the threshold error value for a first predetermined period, and transition from the monitor state to the write state when the determined position error is less than the threshold error value for a second predetermined period. Write operations are enabled and signals are provided to operate the fine actuator to translate the magnetic head laterally in a manner to reduce the determined position error while in the write state, write operations are disabled and signals are provided to operate the fine actuator to translate the magnetic head laterally in a manner to reduce the determined position error while in the monitor state, and write operations are disabled and signals are not provided to operate the fine actuator while in the stop write state.

Transitioning from a write state to a stop write state, and then back to a write state is often a time consuming process. According to one embodiment, methods and systems disclosed herein are capable of transitioning from the write state to the stop write state, and then back to the write state in a faster, more efficient manner. One of the most time consuming aspects of conventional methods of transitioning from the stop write state to the write state is re-acquiring track-following of the servo track. To remedy this problem, according to one embodiment, when the tape drive transitions from the write state to the stop write state, in some circumstances, track-following continues and is not interrupted. This is accomplished by creating a new "monitor" state where track-following continues but writing is halted. This state allows the track-following loop to remain closed when a stop write event occurs so that when the stop write event has passed or been remedied, the tape drive can quickly and easily transition back to a write state.

According to preferred embodiments, less tape capacity loss will occur because the time required to transition between the write state and the stop write state, when a stop write occurs, is shortened. Therefore, less tape runs during the stop write, and more capacity margin is available to the tape drive system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," a "module," or a "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
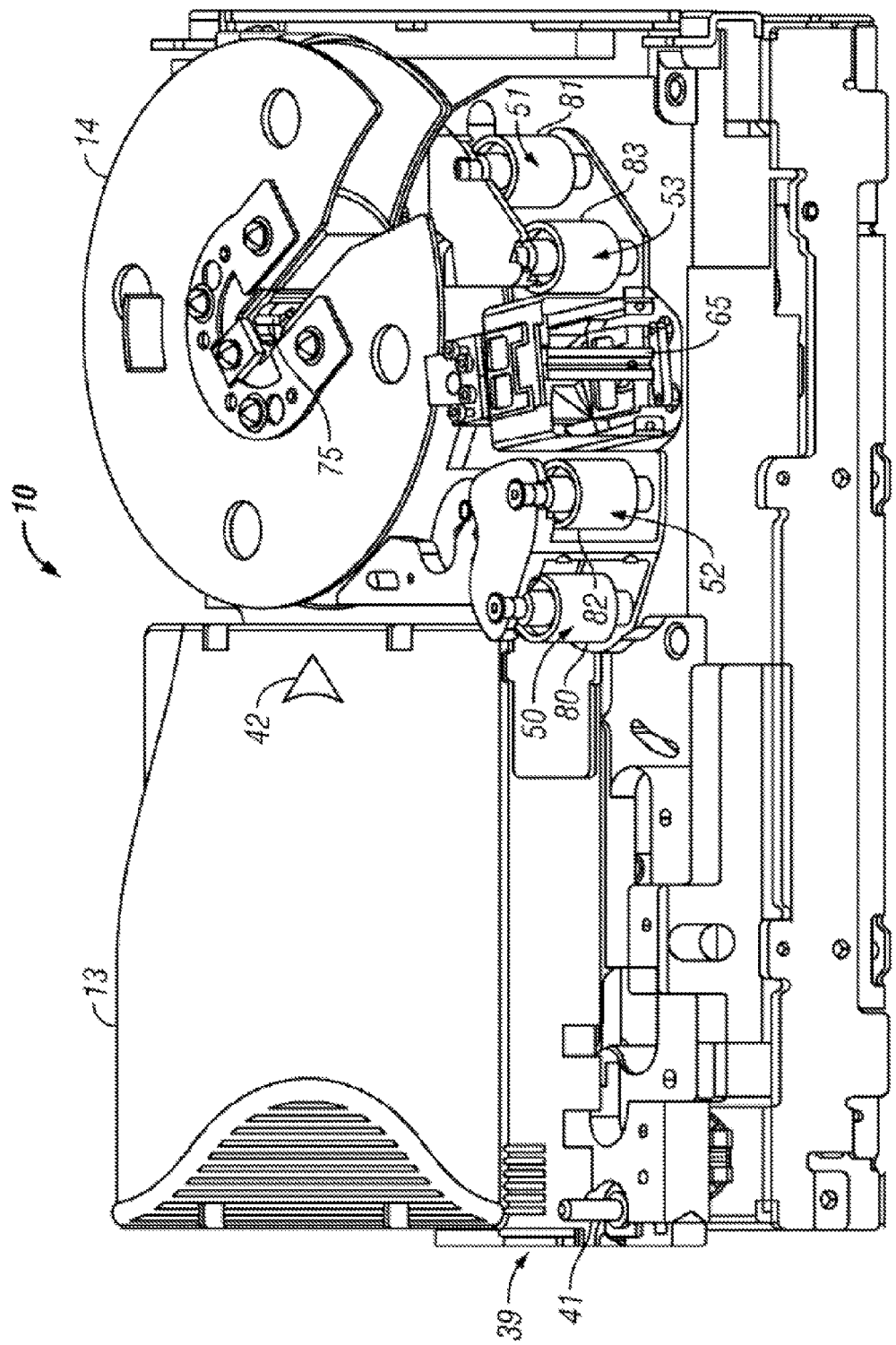
FIG. 2 is a view of the data storage drive of FIG. 1 with the cover removed, according to one embodiment.

FIGS. 1 and 2 illustrate a magnetic tape data storage drive 10 which writes data 18 to and reads data from longitudinal tape comprising magnetic tape data storage media 11, according to one embodiment.

As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in a magnetic tape data storage cartridge 13 to a take-up reel 14. An example of a magnetic tape drive is the IBM® LTO (Linear Tape Open) magnetic tape drive. Another example of a magnetic tape drive is the IBM® TotalStorage Enterprise magnetic tape drive. Both the above examples of magnetic tape drives employ single reel tape cartridges 13. An alternative magnetic tape drive and magnetic tape cartridge is a dual reel cartridge and drive in which both reels 12 and 14 are contained in the cartridge.

The magnetic tape media 11 is moved in the longitudinal direction across a tape head 65. The tape head may be supported and laterally moved by a compound actuator 17 of a track following servo system. The magnetic tape media is supported by roller tape guides 50, 51, 52, 53, which may be flanged or flangeless, while the magnetic tape media is moved longitudinally.

A typical magnetic tape data storage drive operates in both forward and reverse (backward) directions to read and write data. Thus, the magnetic tape head 65 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions, according to various embodiments.

The magnetic tape data storage drive 10 comprises one or more controls 20 for operating the magnetic tape data storage drive in accordance with commands received from an external system. The external system may comprise a network, a host system, a data storage library or automation system, a data storage subsystem, etc., as would be apparent to one of skill in the art upon reading the present descriptions. A control 20 typically comprises logic and/or one or more microprocessors with a memory 19 for storing information and program information for operating the microprocessor(s) and drive. The program information may be supplied to the memory via the interface 21, by an input to the control 20 such as a floppy disk, optical disk, Flash memory, CD-ROM, etc., or by reading from a magnetic tape cartridge, or by any other suitable device or methodology. The magnetic tape data storage drive 10 may comprise a standalone unit or comprise a part of a tape library or other subsystem, which may comprise the external system. The control 20 also provides the data flow and formatter for data to be read from and written to the magnetic tape media, as is known to those of skill in the art.

A cartridge receiver 39 is configured to receive a magnetic tape cartridge 13 oriented in a single direction, and to align the magnetic tape cartridge, for example, with guide pin 41, with respect to the cartridge receiver. The proper orientation may be illustrated on the cartridge itself, for example, by arrow 42 on the cartridge. The proper orientation may be enforced by the specific shape of the cartridge or by using various notches that interact with the receiver, as is known to those of skill in the art. The orientation of the magnetic tape cartridge is such that the magnetic tape 11 exits the cartridge at a specified point of the cartridge receiver. A tape threading mechanism may move the free end of the magnetic tape 11 from the magnetic tape cartridge 13 to a take up reel 14, for example, positioning the free end leader block at the central axis 75 of the take up reel. The magnetic tape is thus positioned along the tape path.

In the illustrated embodiment, flanged or flangeless tape guide rollers 50, 51, 52 and 53 each has a cylindrical surface 80, 81, 82, 83 oriented to provide a tape path for the magnetic tape 11 across the magnetic tape head 65.

The tape path comprises at least one flanged or flangeless tape guide roller 50 positioned between the magnetic tape cartridge 13 and magnetic tape head 65, and may comprise at least one flanged or flangeless tape guide roller 50, 51 at either side of the magnetic tape head 65. Additional tape guide rollers or other types of guides may be provided depending on the length and/or complexity of the tape path, and preferably comprise flangeless tape guide rollers, such as tape guide rollers 52 and 53.

Figure 3:
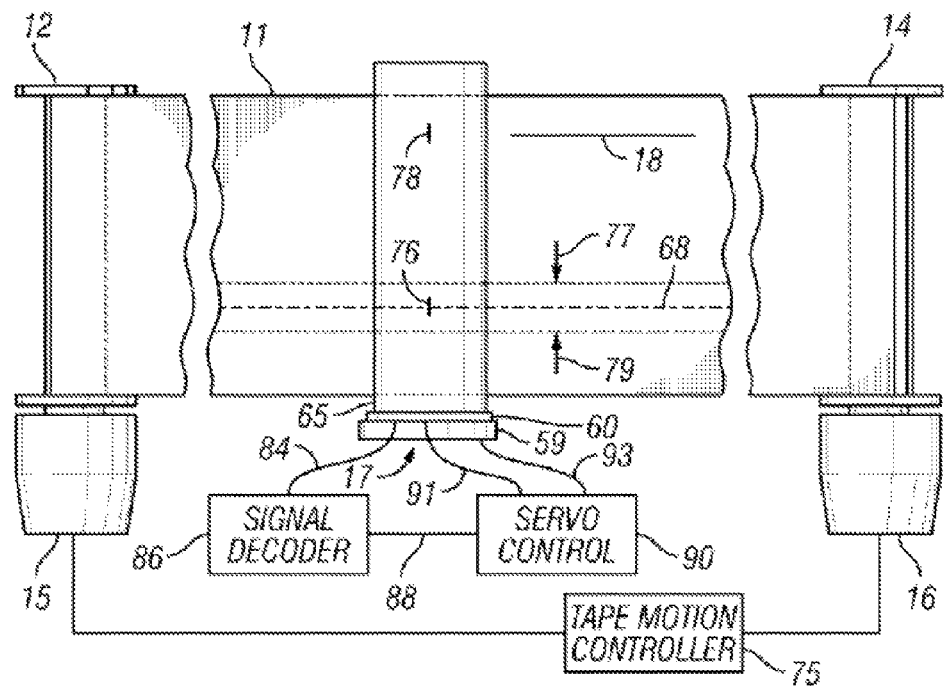
FIG. 3 is a schematic view of the longitudinal tape, tape head and servo system of FIG. 1, according to one embodiment.

Referring to FIG. 3, the longitudinal tape 11 is moved across the tape head 65 between reels 12 and 14 (the tape guide rollers are not shown) by reel motors 15 and 16 under the control of a tape motion controller 75 of control 20 of FIG. 1. The reel motors are operated at various speeds as controlled by the tape motion controller to insure that the magnetic tape media leaves one reel at the same speed that it is wound onto the other reel. Referring again to FIG. 3, the tape motion controller also controls the torque applied to each drive motor 15 and 16 to control the tension applied to the magnetic tape media at the tape head 65.

The magnetic tape head 65 comprises a servo read head, reader, or sensor 76 that senses a servo pattern recorded in a servo track 68 of the tape 11. The servo read head may comprise a plurality of servo read sensors at various positions of the magnetic tape head 65, and the servo track 68 may comprise a number of parallel servo tracks at various positions across the tape 11. As is understood by those of skill in the art, the servo tracks typically extend in the longitudinal direction the full length of the tape, and are prerecorded and defined as a part of the manufacturing process of the tape cartridge 13. A data head 78, which may comprise several data read/write transducers, is shown positioned over a data track region 18 of the tape, for example, containing a plurality of parallel data tracks. As is understood by those of skill in the art, typically, the defined servo tracks of magnetic tape systems are parallel to and offset from the data tracks. The servo track 68 is illustrated as a single line, for example a centerline of a servo track that is wide enough to allow a single servo track or set of tracks to allow servoing of various sets of data tracks by offsetting the servo head from the centerline.

As the tape 11 is moved longitudinally along the tape path, the servo read head 76 reads the servo signals which are provided on a servo signal line 84 to a servo decoder 86. The servo decoder processes the received servo signals and generates a position signal that is provided on a position signal line 88 to a servo control 90. The servo control 90 responds to seek signals to cause the compound actuator 17 to move between servo tracks, and responds to the position signals to cause the actuator 17 to follow the desired servo track.

As the longitudinal tape 11 is moved longitudinally across the magnetic tape head 65, the tape tends to either stay on one side of the tape head or to shift from one side of the tape head to the other. If the tape shifts, the shifting of the tape 11 results in shifting the servo track 68 in the lateral direction, illustrated in FIG. 3 as shifting between lateral shift extreme 77 and lateral shift extreme 79, comprising lateral shift excursions between the extremes.

Figure 4:
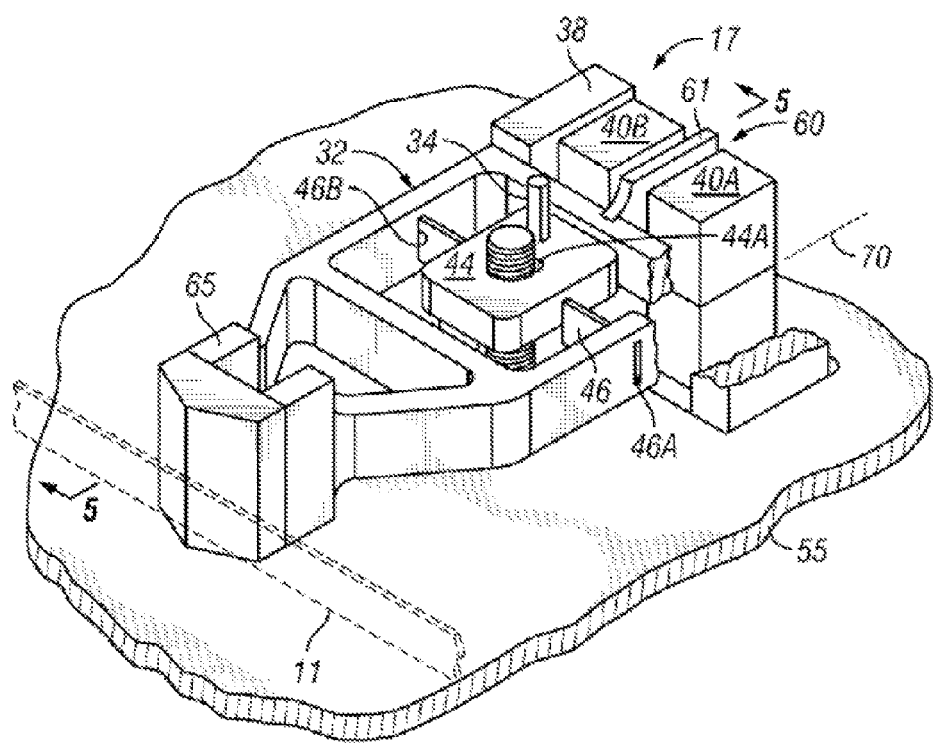
FIG. 4 is a view of a magnetic tape head and compound actuator of the data storage drive of FIG. 1, according to one embodiment.
Figure 5:
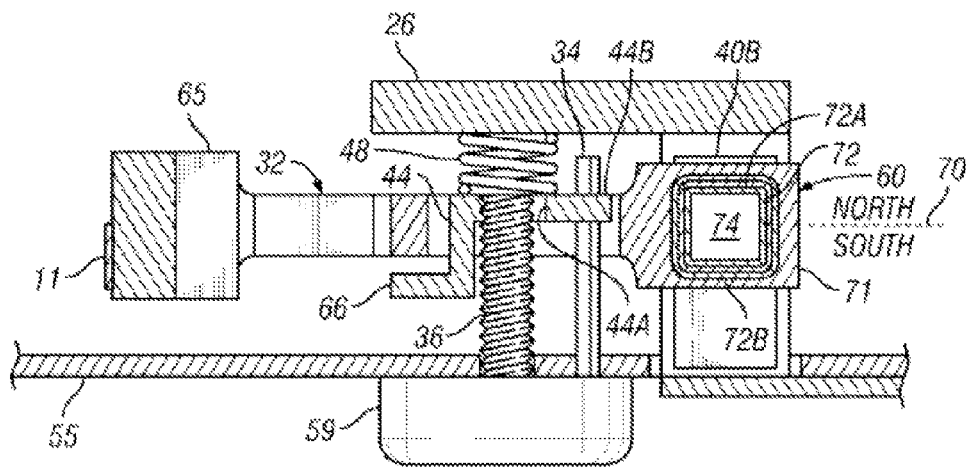
FIG. 5 is a partially cutaway side view of the magnetic tape head and compound actuator of FIG. 4, according to one embodiment.

Referring now to FIGS. 3, 4, and 5, the compound actuator 17 is illustrated according to one embodiment. The actuator 17 comprises an actuator arm 32 mounting the magnetic tape head 65. A coarse actuator motor 59 drives a lead screw 36 to move fine actuator stage 44 at an aperture 44A in a vertical direction perpendicular to a base 55. An aperture 44B is provided to receive an anti-rotation pin 34, and a load spring 48 is provided between a housing 26 and the stage 44. A torsion spring 46 is fixed to the stage 44 and is coupled at its ends 46A and 46B to the actuator arm 32 so that the stage 44 moves the head 65 mounted on the actuator arm 32 in a vertical direction across the tape.

A fine actuator coil assembly 60 is attached to an end of the actuator arm 32. The coil assembly 60 comprises a coil frame 71, a coil 72, and a mandrel 74, in one embodiment. The coil 62 has an upper portion 72A and a lower portion 72B, and is disposed between magnets 40A and 40B held in a magnet housing 38 which are arranged to split the north and south poles at approximately the line 70. The coil moves vertically upon application of a current at the coil 72 and causes the actuator arm 32 to pivot about torsion spring 46 and move the tape head 65 transversely of the tape 11 to make small adjustments such as in track following mode.

The servo control 90 responds to the position signals to generate servo control signals on line 91 to operate the fine actuator 60 to follow the desired servo track, and when the fine actuator movement is insufficient to accommodate the full move, or a large move is required for other purposes, the servo control 90 generates servo control signals on line 93 to cause the coarse actuator 59 to move the fine actuator is the desired direction.

Alternative compound actuators may be used as would be apparent to one of skill in the art upon reading the present descriptions. Each compound actuator has both a fine actuator providing high bandwidth, but with a limited range of travel, and a coarse actuator providing a large working dynamic range.

Figure 6:
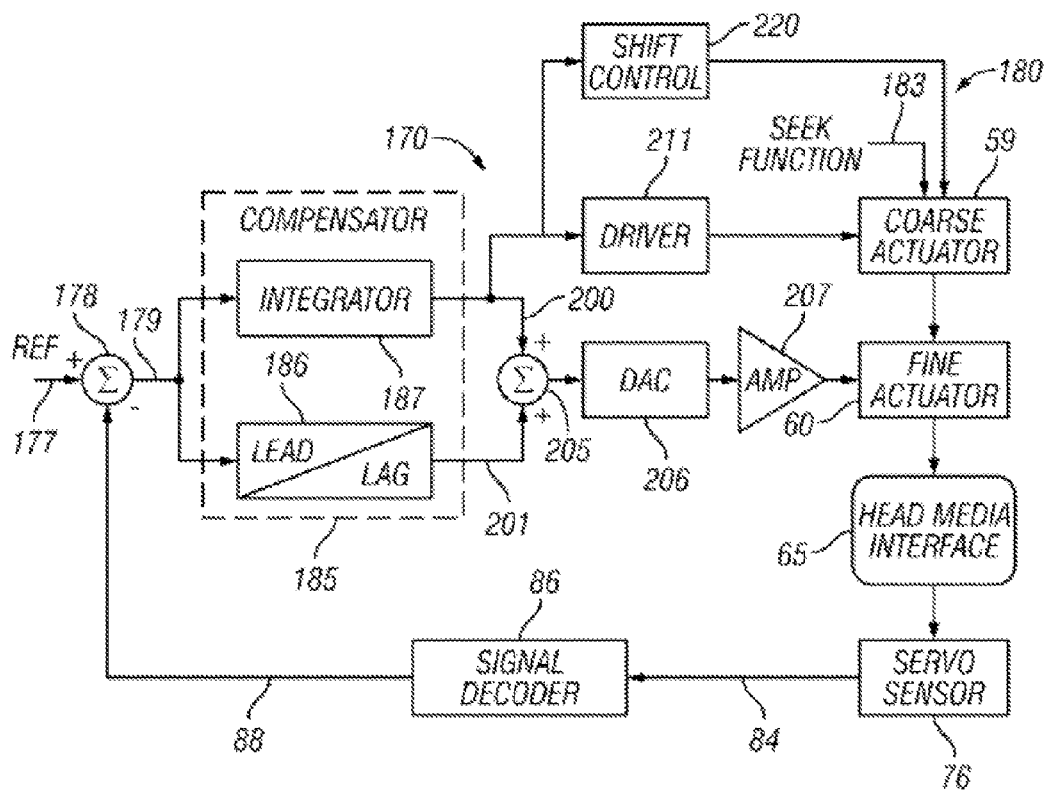
FIG. 6 is a block diagram of an embodiment of the servo system of FIG. 3.

A servo control 90 is illustrated in FIG. 6 as part of a position error signal (PES) loop 170 of a servo system 180, according to one embodiment. The operation of the servo system is discussed in detail in U.S. Pat. No. 6,587,303. Briefly, the servo signals are sensed by servo sensor 76 of head 65, and the position of the servo sensor relative to a servo track is detected from the servo signals by the signal decoder 86. The detected position signals are provided on line 88 and preferably comprise digital signals. The position signals are then compared to a reference signal 177 by a comparator 178 to determine position error between the read and a desired position related to the defined servo tracks, called the PES on line 179.

The fine actuator servo typically has a compensator function 185 in the position error signal loop, which is designed to enable maximum bandwidth with adequate stability margins. The compensator function 185 modifies the PES by applying a variable gain to the PES, which gain is based upon the frequency of the input PES 179, or, from another viewpoint, upon the rates of change of the input PES.

The compensator function 185 includes an integrator 187 and other transfer function elements, such as a lead/lag functional element 186, to achieve the desired static and dynamic system performance and overall stability. Each element may be implemented as a filter, either an analog filter employing discrete components, or a digital filter, such as an IIR (infinite impulse response) or as a FIR (finite impulse response), or as microcode causing a microprocessor to perform the function.

The integrator 187 provides a response 200 that generally reduces the gain as the frequency increases. The lead/lag element 186 provides a response 201 which is enhanced at high frequencies and reduced at low frequencies. The combined response 205 provides a servo signal to the fine actuator 60 that has both high bandwidth and stability, as is understood by those of skill in the art. A digital to analog converter 206 and power amplifier 207 apply the signal to the fine actuator 60.

The integrator 187 integrates the present signal, approximating the current and therefore the force applied to the fine actuator, with prior signals to determine the DC component of the fine actuator PES. An alternative integration function comprises determining the DC component of the drive current for the fine actuator. The integration function output signal on connection 200 provides an integration control signal to a driver 211, which drives the coarse actuator 59, operating the coarse actuator to translate the fine actuator. If the coarse actuator is a stepper motor, the driver 211 is preferably digital up-down logic and a stepper driver. Thus, if the absolute maximum value of the integration function output signal is larger than the absolute minimum value, the driver 211 operates the stepper motor to step in a direction to center the maximum and minimum values of the integration output signal. A step of the stepper motor may result in a linear translation of the fine actuator, for example, of about 3 microns. Alternatively, in one approach, if the coarse actuator is analog, the driver 211 may convert the digital signal to analog and employ a power amplifier to operate the coarse actuator 59.

The coarse actuator may also be operated by a seek function 183 which moves the fine actuator from one servo track to another.

The output 200 of the integrator is also supplied to a shift control 220 in accordance with one embodiment which moves the coarse actuator to a specific location and maintains it at that location.

Figure 7:
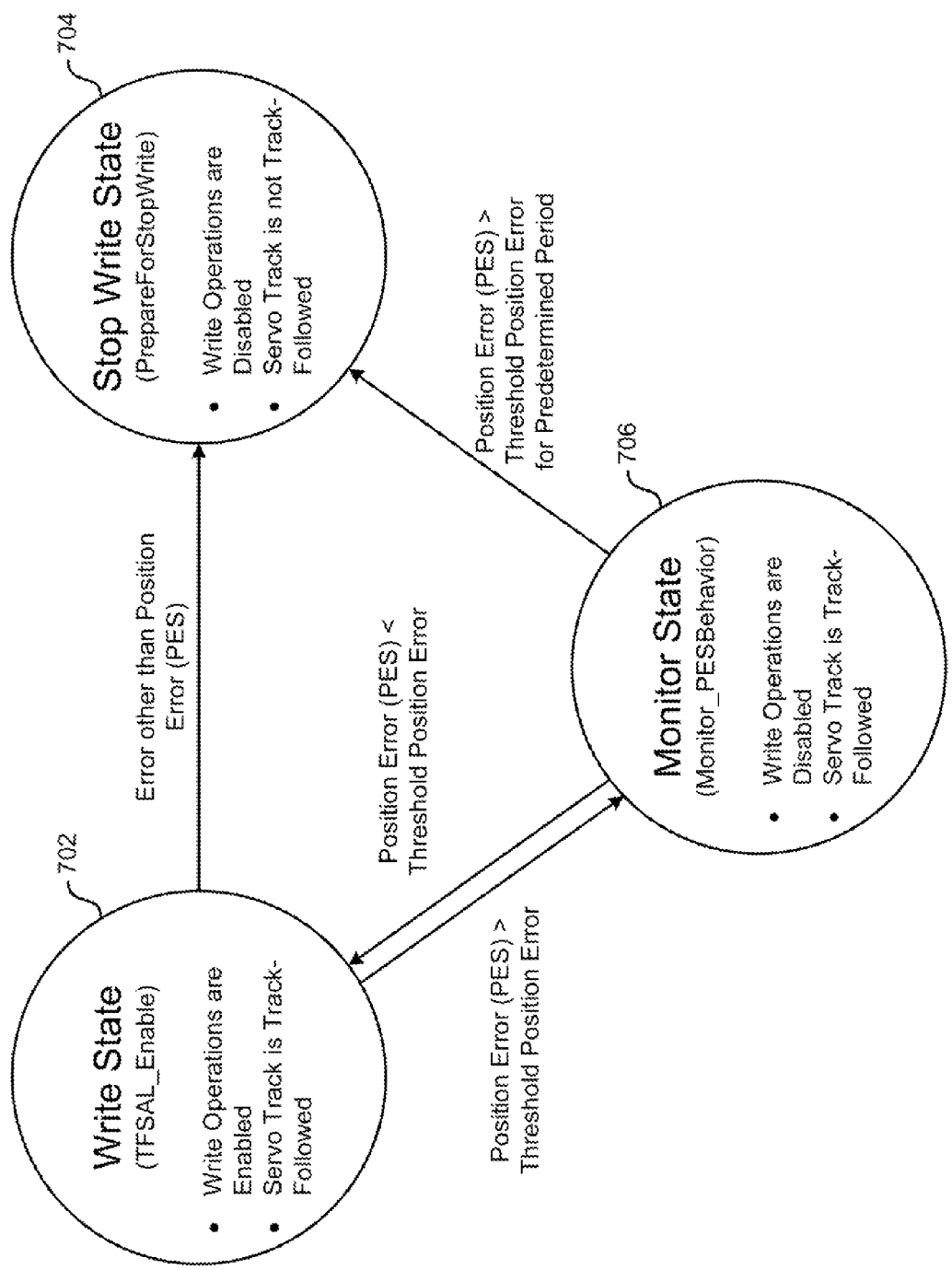
FIG. 7 is a diagram showing various writing states, according to one embodiment.

As shown in FIG. 7, interactions and transitions between writing states may be described according to one embodiment. When the tape drive is in the Write State 702, which may be referred to in code as TFSAL_Enable, write operations are enabled and the servo track is track-followed using any method as would be understood by one of skill in the art upon reading the present descriptions.

During the track-following, position error is monitored and if the position error (such as a PES, as described herein) exceeds a threshold position error, which may be predefined in drive firmware, or by a user, by an administrator, etc., the tape drive may be transitioned into a Monitor State 706.

When the tape drive is in the Monitor State 706, which may be referred to in code as Monitor_PESBehavior, write operations are disabled and the servo track is continued to be track-followed using any method as would be understood by one of skill in the art upon reading the present descriptions.

Once again, during the track-following, position error is monitored and if the position error exceeds the threshold position error for a predetermined period, which may be predefined in drive firmware, or by a user, by an administrator, etc., and may be related to any factor as would be understood by one of skill in the art, the tape drive may be transitioned into a Stop Write State 704.

When the tape drive is in the Stop Write State 704, which may be referred to in code as PrepareForStopWrite, write operations are disabled and the servo track is no longer track-followed.

The tape drive remains in the Stop Write State 704 until the tape drive progresses through an intermediate write state (not pictured) which may comprise one or more steps or processes before the tape drive is allowed to enter the Write State 702 again.

Figure 8:
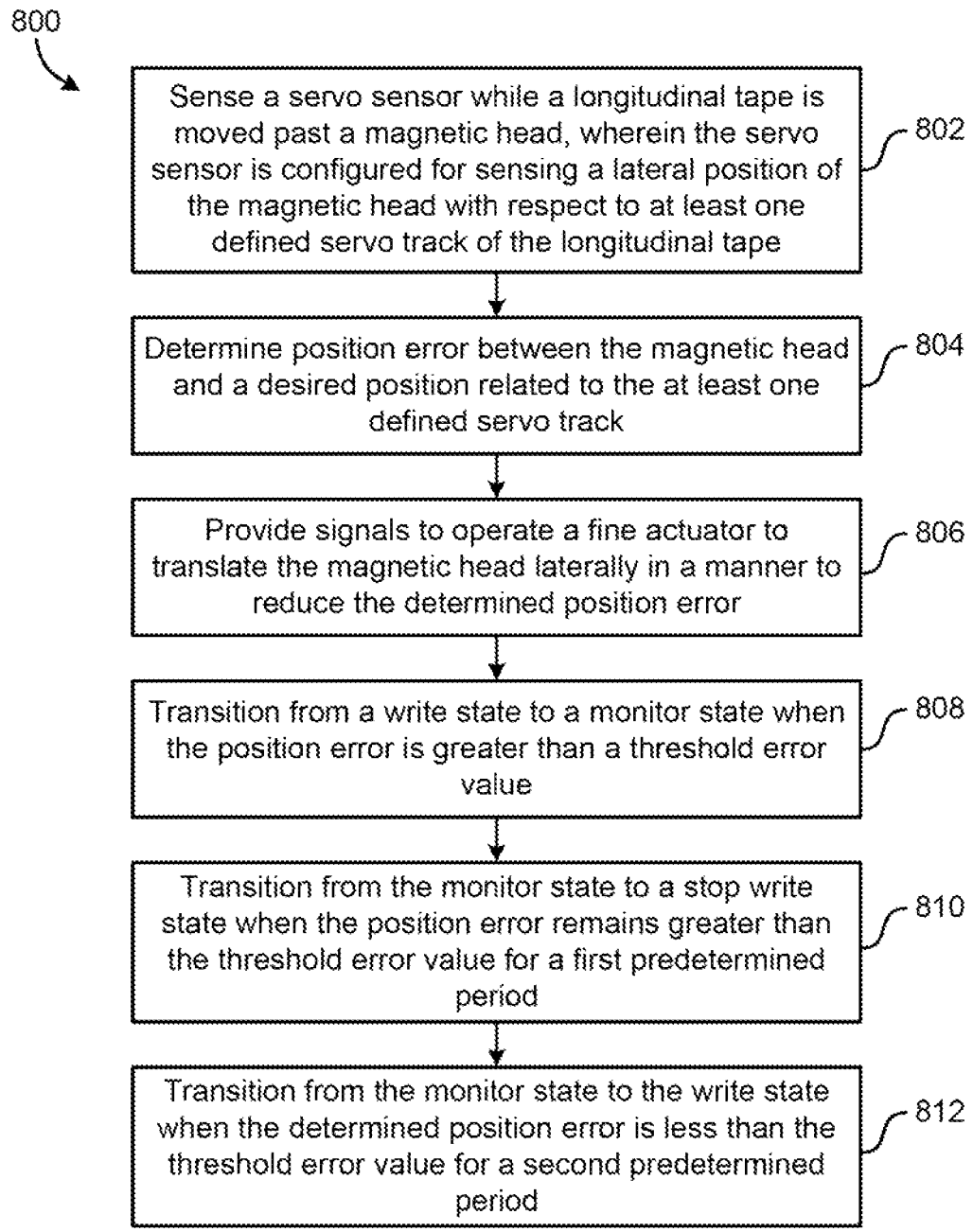
FIG. 8 is a flow diagram of a method, according to one embodiment.

Now referring to FIG. 8, a method 800 is shown according to one embodiment. The method 800 may be carried out in any desired environment, including those shown in FIGS. 1-7, according to various embodiments. Of course, more or less operations than those specifically described below may be included and/or excluded from method 800, according to various embodiments, as would be apparent to one of skill in the art upon reading the present descriptions.

In preliminary operations, a tape may be loaded in a tape drive and a tape motion controller may operate at least one drive motor to move the tape longitudinally past a magnetic head. Also, the servo signal may be acquired from a servo sensor, such as by a signal decoder, in some approaches.

In operation 802, the servo sensor is sensed while a longitudinal tape is moved past a magnetic head, wherein the servo sensor is configured for sensing a lateral position of the magnetic head with respect to at least one defined servo track of the longitudinal tape.

In operation 804, position error is determined between the magnetic head and a desired position related to the at least one defined servo track. This position error may be related to the DC component of the fine actuator PES, in some embodiments.

According to some embodiments, when the tape drive is in the write state and an error other than a PES range error occurs, the tape drive transitions to the stop write state and then into other states and procedures, depending on the severity of the error, current commands, user input, etc.

In operation 806, signals are provided to operate a fine actuator to translate the magnetic head laterally in a manner to reduce the determined position error. The fine actuator is configured to translate the magnetic head laterally with respect to the longitudinal tape.

In one embodiment, while the servo signal is track-followed, an integrator may effectively integrate signals representing the force applied to the fine actuator and may indicate the present position of the servo track with respect to the coarse actuator, for example, ultimately reaching "0." Shift control determines, from the integrator, the DC component of the position error signal. This "0" position is one extreme of the lateral shift of the tape.

In operation 808, the tape drive, a control such as a servo control, or some other logic, component, and/or system is transitioned from a write state to a monitor state when the position error is greater than a threshold error value.

In another embodiment, the transition from the write state to the monitor state allows the track-following servo to still be locked in track-following mode, but a write enable flag is disabled, thus preventing any write operations from being performed. This is accomplished when the PES is greater than the threshold error value, also referred to as a "stop write limit," and the track-following servo remains in the monitor state until the PES value returns to an acceptable level below the stop write limit.

In operation 810 the tape drive, a control such as a servo control, or some other logic, component, and/or system is transitioned from the monitor state to a stop write state when the position error remains greater than the threshold error value for a first predetermined period.

Any of several factors, as would be understood by one of skill in the art upon reading the present descriptions, may be used to dictate the first predetermined period for which the PES is greater than the stop write limit before the tape drive enters the stop write state. For example, some factors may relate to what caused the monitor state to be entered into in the first place. For some stop write events, this period may be a few servo samples or interrupt cycles (typically about 50 μsec) or it may be several more samples, in various embodiments.

In another embodiment, the first predetermined period may comprise at least one of: a number of position error samples being determined, an amount of time, and an amount of tape movement in the longitudinal direction.

In operation 812, the tape drive, a control such as a servo control, or some other logic, component, and/or system is transitioned from the monitor state to the write state when the determined position error is less than the threshold error value for a second predetermined period.

In another embodiment, the second predetermined period may comprise at least one of: a number of position error samples being determined, an amount of time, and an amount of tape movement in the longitudinal direction.

For example, while the tape drive, a control such as a servo control, or some other logic, component, and/or system is in the monitor state, the PES value is monitored for an indication that the track-following servo may transition back to the write state, where the write enable would be switched to "on." Also, during this monitor state, the number of servo samples is monitored and if a predetermined number of samples (such as 5 samples, 10 samples, 20 samples, 30 samples, etc.) have passed without the PES value returning into an acceptable range (e.g., below the error threshold value), the tape drive, a control such as a servo control, or some other logic, component, and/or system may transition to the stop write state where the track-following servo is interrupted (the servo loop is opened). Once in this state, the track-following servo moves to a different set of states and procedures where it once again tries to re-acquire the servo signal when appropriate.

Any of several factors, as would be understood by one of skill in the art upon reading the present descriptions, may be used to dictate the second predetermined period for which the PES is less than the stop write limit before the tape drive, a control such as a servo control, or some other logic, component, and/or system re-enters the write state. For example, some factors may relate to what caused the monitor state to be entered into in the first place. For some stop write events, this period may be a few servo samples or interrupt cycles (typically about 50 μsec) or it may be several more samples, in various embodiments.

The transition between the write state, where the track-following servo is locked to a servo track and write operations are enabled (such as by setting the write enable flag to "on"), sometimes referred to as track-following servo assist logic (TFSAL), to the monitor state may happen within a single servo sample whether transitioning from the write state to the monitor state, or from the monitor state to the write state. This transition occurs much faster than conventional methods which may take several hundred or several thousand samples in order to transition between the stop write state and the write state in current stop write methods.

In one embodiment, when in the write state, write operations are enabled and signals are provided to operate the fine actuator while in the write state.

According to one embodiment, when in the monitor state, write operations are disabled and track-following continues as in the write state (e.g., the servo signal is track-followed and the servo lock is maintained).

In another embodiment, when in the stop write state, write operations are continued to be disabled, as in the monitor state, and signals are not provided to operate the fine actuator, e.g., track-following is interrupted.

According to some embodiments, the tape drive may be used in environments having high vibration where the number of stop write events occur very frequently. Using conventional methods, the lost tape capacity would be excessive and would cause the tape capacity to drop below market (and/or advertised) value. However, by implementing the monitor state in the tape drive, the transition from monitor state to write state and vice versa is substantially faster, and so when vibrations cause the transition over and over again, excessive tape capacity is not lost.

In another embodiment, the tape drive, a control such as a servo control, or some other logic, component, and/or system may be transitioned from the stop write state to a write preparation state when the determined position error is greater than a multiple of the threshold error value or greater than the threshold error value for a third predetermined period. For example, the multiple may be any value as would be understood by one of skill in the art, such as about 1.2, 1.5, 2, 3, 5, etc., or may be related to some other factor which indicates that the tape drive is capable of performing write operations without exceeding the position error threshold value, according to various embodiments.

In one embodiment, the third predetermined period may comprise at least one of: a number of position error samples being determined, an amount of time, and an amount of tape movement in the longitudinal direction.

In the write preparation state, write operations are disabled, a first servo sensor is sensed, position error is determined between the magnetic head and a desired position related to the at least one defined servo track, and signals are provided to operate the fine actuator to translate the magnetic head laterally in a manner to reduce the determined position error in an attempt to re-acquire a lock on the at least one defined servo track while in the write preparation state (e.g., track-following may be reinitiated).

In some embodiments, the tape drive, a control such as a servo control, or some other logic, component, and/or system may be transitioned from the write state to the stop write state when an error is detected other than the position error being greater than the threshold error value. This ensures that significant errors where the servo track is not simply lost for a period of time.

In one embodiment, the longitudinal tape may comprise a plurality of the defined servo tracks and a plurality of data bands, each data band positioned between two of the defined servo tracks. In a further embodiment, the threshold error value may relate to about 5%, 10%, 20%, 25%, or some other fraction or multiple of a distance between the at least one defined servo track and an adjacent defined servo track of the longitudinal tape.

In another embodiment, the threshold error value may be in a range from about 0.5 µm to about 1.5 µm of lateral tape movement, such as about 0.8 µm of lateral tape movement.

According to preferred embodiments, improvements by a factor of over 20 may be achieved in keeping tape capacity from being lost due to tape running during transitioning between states.

Any of the implementations and/or embodiments described herein may involve software, firmware, microcode, hardware and/or any combination thereof. The implementation may take the form of code or logic implemented in a medium in the control (20, FIG. 1), such as memory, storage and/or circuitry where the medium may comprise hardware logic (e.g., an integrated circuit chip, Programmable Gate Array (PGA), Application Specific Integrated Circuit (ASIC), or other circuit, logic or device), or a computer readable storage medium, such as a magnetic storage medium, e.g., an electronic, magnetic, optical, electromagnetic, infrared, or semiconductor system, semiconductor or solid state memory, magnetic tape, a removable computer diskette, and random access memory (RAM), a read-only memory (ROM), a rigid magnetic disk and an optical disk, compact disk-read only memory (CD-ROM), compact disk-read/write (CD-R/W), digital versatile disk (DVD), etc.

For example, in one embodiment, a tape drive system, such as tape drive 10 shown in FIG. 1, may comprise a magnetic head, such as tape head 65, comprising at least one servo sensor, such as sensor 76, the servo sensor being for sensing a lateral position of the magnetic head with respect to at least one defined servo track, such as servo track 68, of a longitudinal tape, such as tape 11, a tape motion controller, such as tape motion controller 75, configured to operate at least one drive motor, such as drive motors 15 and 16, to move the longitudinal tape longitudinally past the magnetic head, a fine actuator, such as fine actuator 60, configured to translate the magnetic head laterally with respect to the longitudinal tape, a coarse actuator, such as coarse actuator 59, configured to translate the fine actuator laterally with respect to the longitudinal tape, and a control, such as control 20 and/or servo control 90. The control may be configured to sense a first servo sensor of the at least one servo sensor, determine position error between the magnetic head and a desired position related to the at least one defined servo track, provide signals to operate the fine actuator to translate the magnetic head laterally in a manner to reduce the determined position error, transition from a write state to a monitor state when the determined position error is greater than a threshold error value, transition from the monitor state to a stop write state when the determined position error is greater than the threshold error value for a first predetermined period, and transition from the monitor state to the write state when the determined position error is less than the threshold error value for a second predetermined period. Write operations are enabled and signals are provided to operate the fine actuator to translate the magnetic head laterally in a manner to reduce the determined position error while in the write state, write operations are disabled and signals are provided to operate the fine actuator to translate the magnetic head laterally in a manner to reduce the determined position error while in the monitor state, and write operations are disabled and signals are not provided to operate the fine actuator while in the stop write state.

In more embodiments, methods and/or techniques described herein according to various embodiments may be embodied in a computer program product. For example, in one embodiment, a computer program product may comprise a computer readable storage medium having computer readable program code embodied therewith. The computer readable program code may comprise computer readable program code configured to: sense a servo sensor while a longitudinal tape is moved past a magnetic head, wherein the servo sensor is configured for sensing a lateral position of the magnetic head with respect to at least one defined servo track of the longitudinal tape; determine position error between the magnetic head and a desired position related to the at least one defined servo track; provide signals to operate a fine actuator to translate the magnetic head laterally in a manner to reduce the determined position error, wherein the fine actuator is configured to translate the magnetic head laterally with respect to the longitudinal tape; transition from a write state to a monitor state when the determined position error is greater than a threshold error value; transition from the monitor state to a stop write state when the determined position error is greater than the threshold error value for a first predetermined period; and transition from the monitor state to the write state when the determined position error is less than the threshold error value for a second predetermined period.

Of course, any of the embodiments described previously may be implemented in the computer program product. For example, in one embodiment, the computer readable program code may be configured to transition from the stop write state to a write preparation state when the determined position error is greater than a multiple of the threshold error value or greater than the threshold error value for a third predetermined period. While in the write preparation state, write operations are disabled, a first servo sensor is sensed, position error is determined between the magnetic head and a desired position related to the at least one defined servo track, and signals are provided to operate the fine actuator to translate the magnetic head laterally in a manner to reduce the determined position error in an attempt to re-acquire a lock on the at least one defined servo track.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive system, comprising:
    a magnetic head, comprising at least one servo sensor for sensing a lateral position of the magnetic head with respect to at least one defined servo track of a longitudinal tape;
    a tape motion controller configured to operate at least one drive motor to move the longitudinal tape longitudinally past the magnetic head;
    a fine actuator configured to translate the magnetic head laterally with respect to the longitudinal tape;
    a coarse actuator configured to translate the fine actuator laterally with respect to the longitudinal tape; and
    a control configured to:
        sense a first servo sensor of the at least one servo sensor;
        determine position error between the magnetic head and a desired position related to the at least one defined servo track;
        provide signals to operate the fine actuator to translate the magnetic head laterally in a manner to reduce the determined position error;
        transition from a write state to a monitor state when the determined position error is greater than a threshold error value;
        transition from the monitor state to a stop write state when the determined position error is greater than the threshold error value for a first predetermined period; and
        transition from the monitor state to the write state when the determined position error is less than the threshold error value for a second predetermined period,
    wherein write operations are enabled and signals are provided to operate the fine actuator to translate the magnetic head laterally in a manner to reduce the detmained position error while in the write state,
    wherein write operations are disabled and signals are provided to operate the fine actuator to translate the magnetic head laterally in a manner to reduce the determined position error while in the monitor state, and
    wherein write operations are disabled and signals are not provided to operate the fine actuator while in the stop write state.

2. The tape drive system as recited in claim 1, wherein the control is configured to transition from the stop write state to a write preparation state when the determined position error is greater than a multiple of the threshold error value or greater than the threshold error value for a third predetermined period, wherein write operations are disabled, a first servo sensor is sensed, position error is determined between the magnetic head and a desired position related to the at least one defined servo track, and signals are provided to operate the fine actuator to translate the magnetic head laterally in a manner to reduce the determined position error in an attempt to re-acquire a lock on the at least one defined servo track while in the write preparation state.

3. The tape drive system as recited in claim 2, wherein the third predetermined period comprises at least one of: a number of position error samples being determined, an amount of time, and an amount of tape movement in the longitudinal direction.

4. The tape drive system as recited in claim 1, wherein the first and second predetermined periods comprise at least one of a number of position error samples being determined, an amount of time, and an amount of tape movement in the longitudinal direction.

5. The tape drive system as recited in claim 1, wherein the longitudinal tape comprises a plurality of the defined servo tracks and a plurality of data bands, each data band positioned between two of the defined servo tracks.

6. The tape drive system as recited in claim 1, wherein the threshold error value is related to about 20% of a distance between the at least one defined servo track and an adjacent defined servo track.

7. The tape drive system as recited in claim 1, wherein the threshold error value is in a range from about 0.5 µm to about 1.5 µm of lateral tape movement.

8. The tape drive system as recited it claim 1, wherein the threshold error value is about 0.8 µm of lateral tape movement.

9. The tape drive system as recited in claim 1, wherein the control is configured to transition from the write state to the stop write state when an error is detected other than the position error being greater than the threshold error value.

10. A computer program product comprising a non-transitory computer readable storage medium having computer readable program code embodied therewith, the computer readable program code comprising:
    computer readable program code configured to sense a servo sensor while a longitudinal tape is moved past a magnetic head, wherein the servo sensor is configured for sensing a lateral position of the magnetic head with respect to at least one defined servo track of the longitudinal tape;
    computer readable program code configured to determine position error between the magnetic head and a desired position related to the at least one defined servo track;
    computer readable program code configured to provide signals to operate the fine actuator to translate the magnetic head laterally in a manner to reduce the determined position error, wherein the fine actuator is configured to translate the magnetic head laterally with respect to the longitudinal tape;
    computer readable program code configured to transition from a write state to a monitor state when the determined position error is greater than a threshold error value;
    computer readable program code configured to transition from the monitor state to a stop write state when the determined position error is greater than the threshold error value for a first predetermined period; and
    computer readable program code configured to transition from the monitor state to the write state when the determined position error is less than the threshold error value for a second predetermined period,
    wherein write operations are enabled and signals are provided to operate the fine actuator to translate the magnetic head laterally in a manner to reduce the determined position error while in the write state,
    wherein write operations are disabled and signals are provided to operate the fine actuator to translate the magnetic head laterally in a manner to reduce the determined position error while in the monitor state, and wherein write operations are disabled and signals are not provided to operate the fine actuator while in the stop write state.

11. The computer program product as recited in claim 10, further comprising:

computer readable program code configured to transition from the stop write state to a write preparation state when the determined position error is greater than a multiple of the threshold error value or greater than the threshold error value for a third predetermined period, wherein write operations are disabled, a first servo sensor is sensed, position error is determined between the magnetic head and a desired position related to the at least one defined servo track, and signals are provided to operate the fine actuator to translate the magnetic head laterally in a manner to reduce the determined position error in an attempt to re-acquire a lock on the at least one defined servo track while in the write preparation state.

* * * * *